(12) United States Patent
Klein

(10) Patent No.: US 12,162,101 B2
(45) Date of Patent: Dec. 10, 2024

(54) WELDING CURRENT SOURCE

(71) Applicant: SKS WELDING SYSTEMS GMBH, Kaiserslautern (DE)

(72) Inventor: Thomas Klein, Rodenbach (DE)

(73) Assignee: SKS WELDING SYSTEMS GMBH, Kaiserslautern (DE)

( * ) Notice: Subject to any disclaimer, the term of this patent is extended or adjusted under 35 U.S.C. 154(b) by 626 days.

(21) Appl. No.: 16/649,636

(22) PCT Filed: Sep. 22, 2018

(86) PCT No.: PCT/EP2018/000444
§ 371 (c)(1),
(2) Date: May 22, 2020

(87) PCT Pub. No.: WO2019/057332
PCT Pub. Date: Mar. 28, 2019

(65) Prior Publication Data
US 2020/0298330 A1 Sep. 24, 2020

(30) Foreign Application Priority Data
Sep. 22, 2017 (DE) ..................... 10 2017 009 141.2

(51) Int. Cl.
*B23K 9/10* (2006.01)
*B23K 9/16* (2006.01)
(Continued)

(52) U.S. Cl.
CPC .............. *B23K 9/1006* (2013.01); *B23K 9/16* (2013.01); *B23K 9/323* (2013.01); *B23K 37/02* (2013.01)

(58) Field of Classification Search
CPC ........ B23K 37/02; B23K 9/1006; B23K 9/16; B23K 9/323
(Continued)

(56) References Cited

U.S. PATENT DOCUMENTS 5,734,148 A 3/1998 Latvis et al.
7,241,973 B1 7/2007 Di Novo et al.
(Continued)

FOREIGN PATENT DOCUMENTS

DE 1747118 U 6/1957
JP S56131084 A 10/1981

*Primary Examiner* — Dana Ross
*Assistant Examiner* — James F Sims, III
(74) *Attorney, Agent, or Firm* — Tarolli, Sundheim, Covell & Tummino LLP

(57) ABSTRACT

A welding current source for supplying an arc welding torch with electric current and electric voltage for carrying out an arc welding method, wherein the arc welding current source is provided with a housing in which a current transformer device is provided for processing electric current and voltage fed into the welding current source for suitability in an arc welding method, wherein furthermore two pole contact devices are provided on the housing of the welding current source, each of which protrudes out of the housing along a respective longitudinal axis and is provided with connecting means for receiving a welding current cable. The aim is to provide a possibility that collisions with welding current cables connected to a welding current source of the aforementioned type can be prevented as much as possible.

7 Claims, 13 Drawing Sheets

(51) Int. Cl.
*B23K 9/32* (2006.01)
*B23K 37/02* (2006.01)

(58) Field of Classification Search
USPC .......................................... 219/137 PS, 137.9
See application file for complete search history.

(56) References Cited

U.S. PATENT DOCUMENTS

| | | | | |
|---|---|---|---|---|
| 7,377,825 | B2 * | 5/2008 | Bankstahl | ................ H01R 4/56 |
| | | | | 439/337 |
| 7,442,898 | B2 * | 10/2008 | Di Novo | ................ B23K 37/02 |
| | | | | 219/136 |
| 8,536,488 | B2 * | 9/2013 | Ertmer | ................... B23K 9/123 |
| | | | | 219/136 |
| 2005/0258115 | A1 | 11/2005 | Smith et al. | |

\* cited by examiner

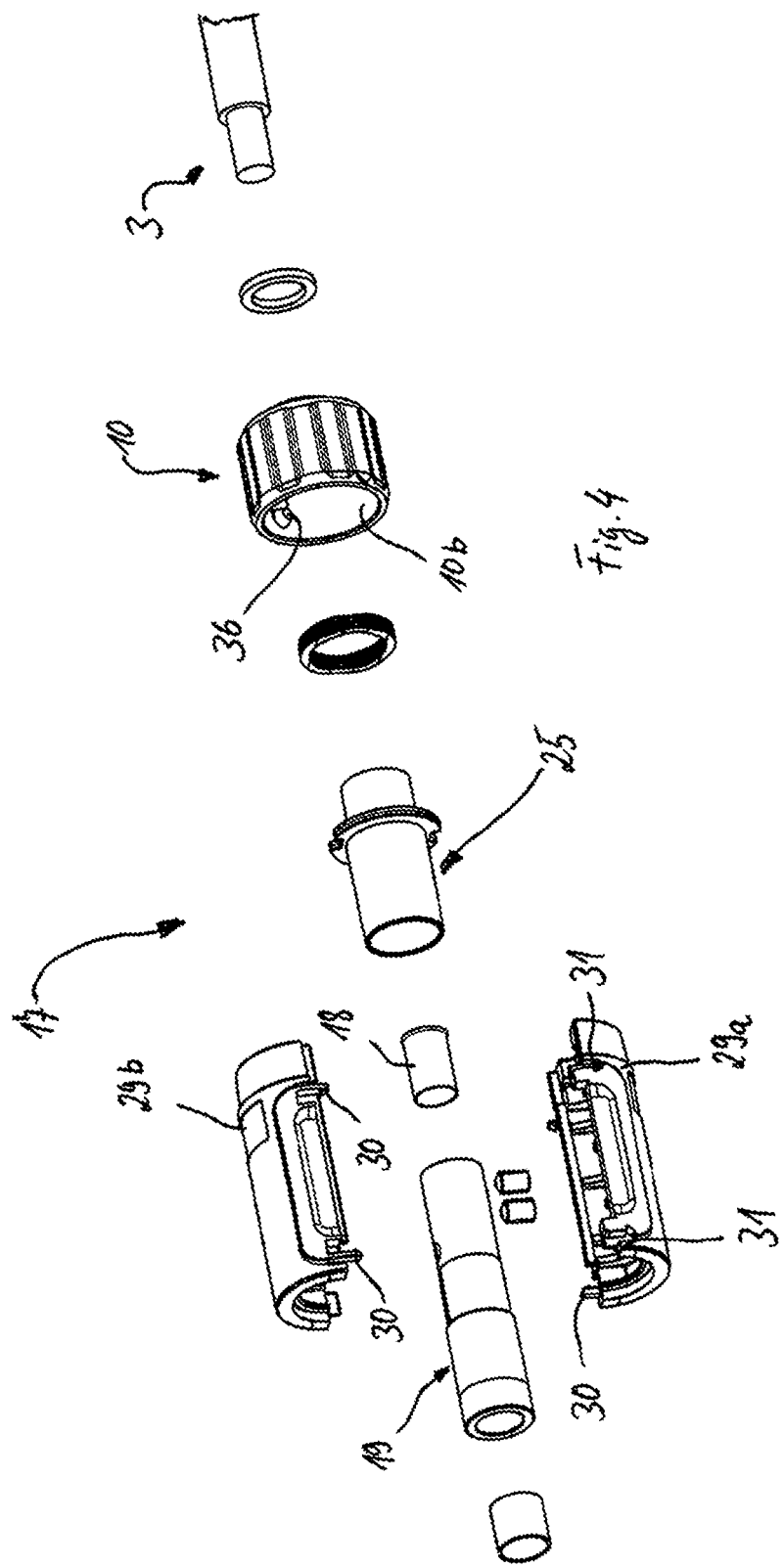

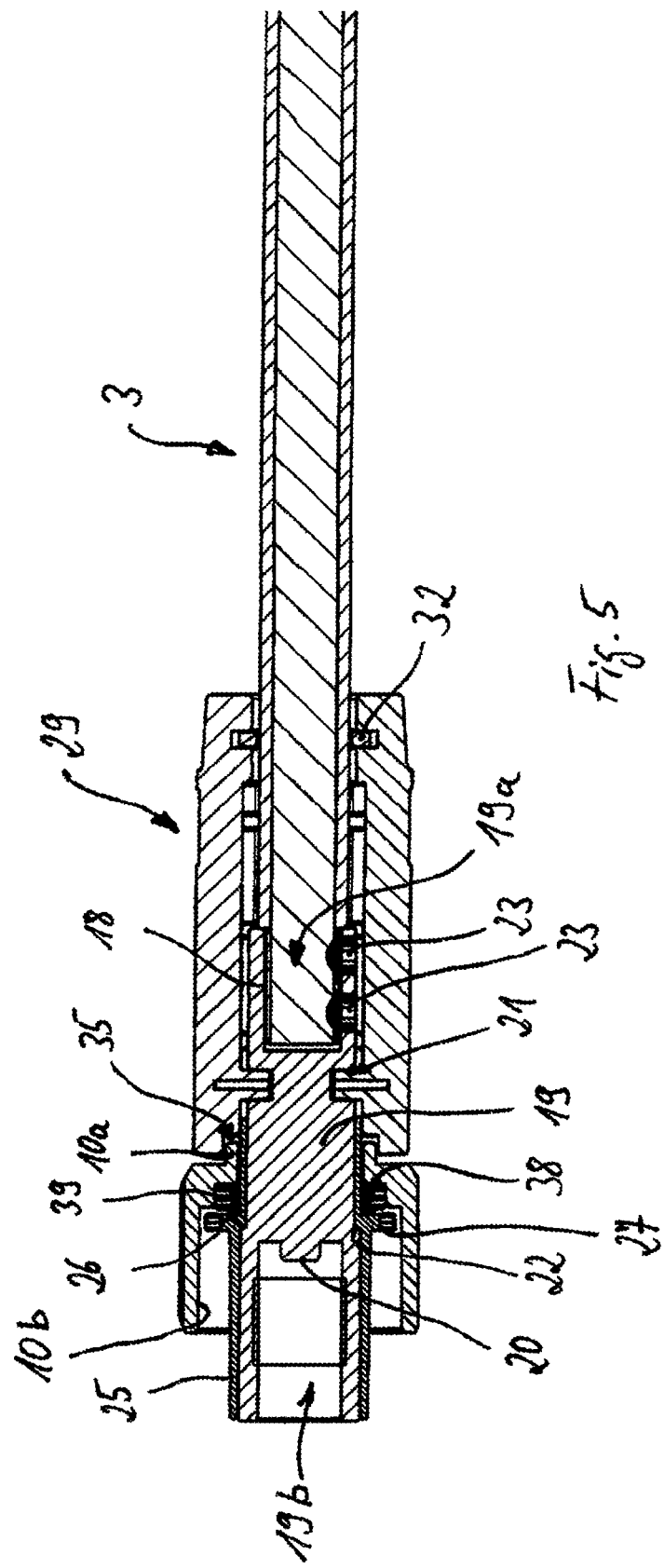

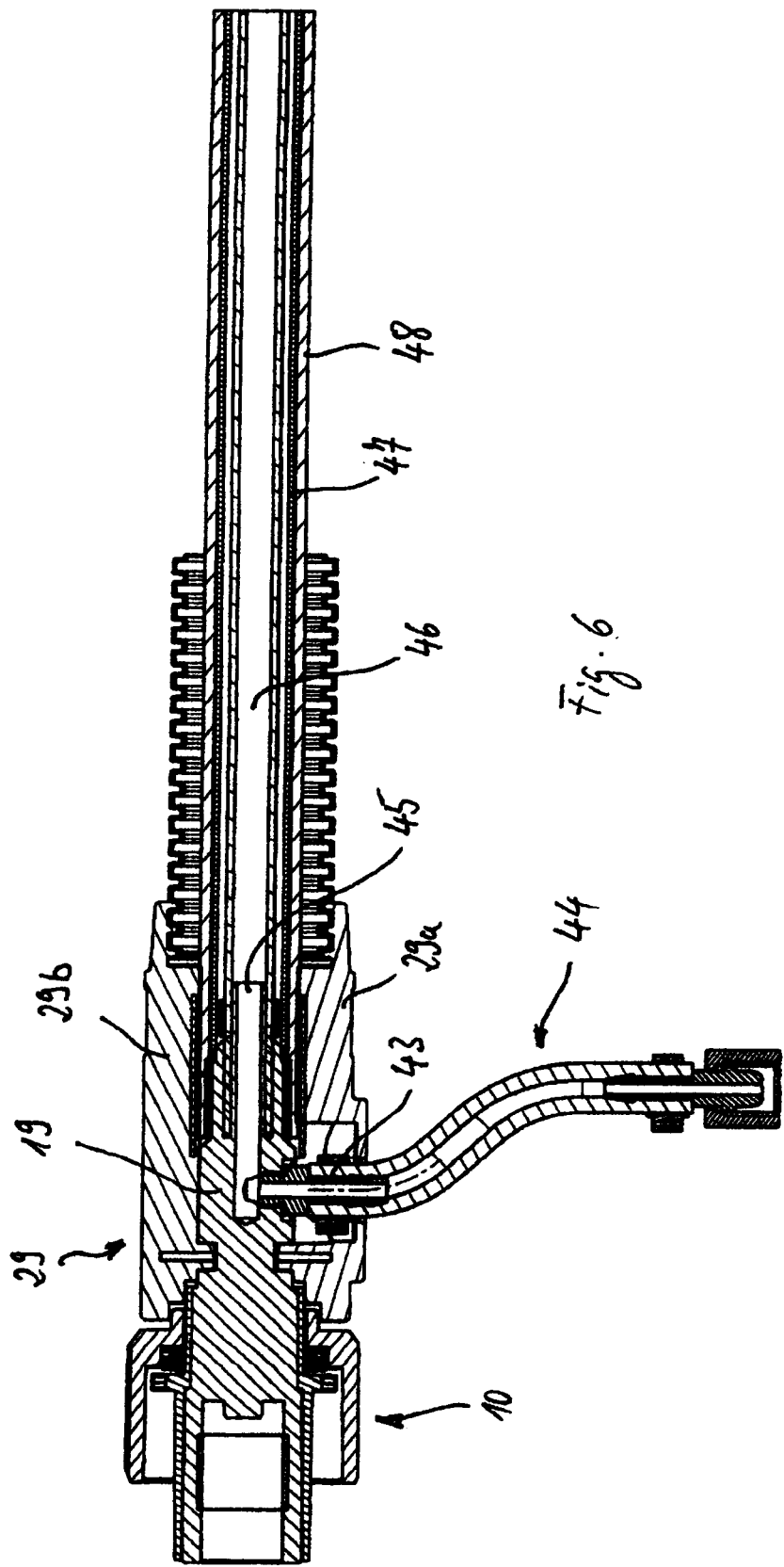

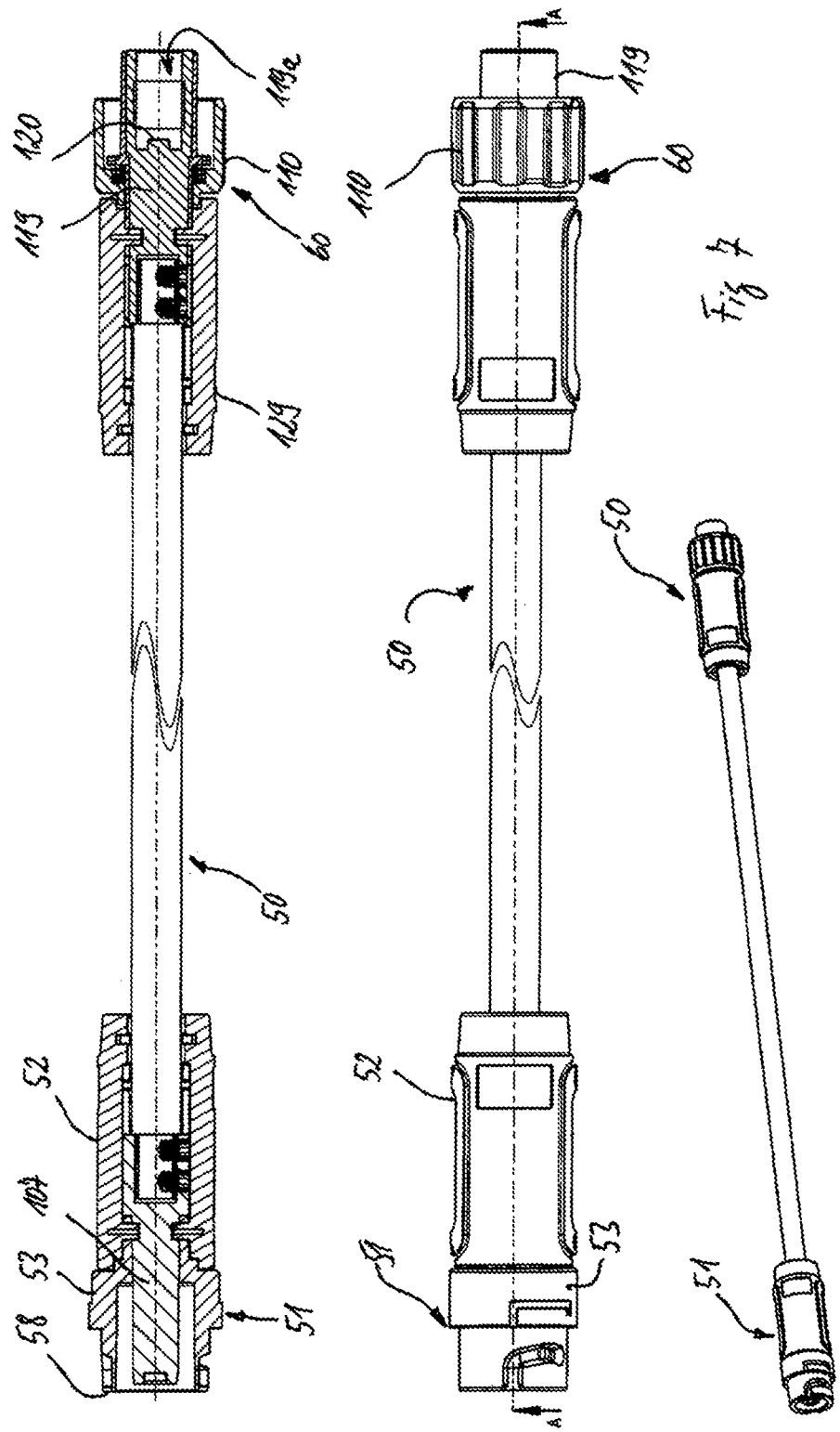

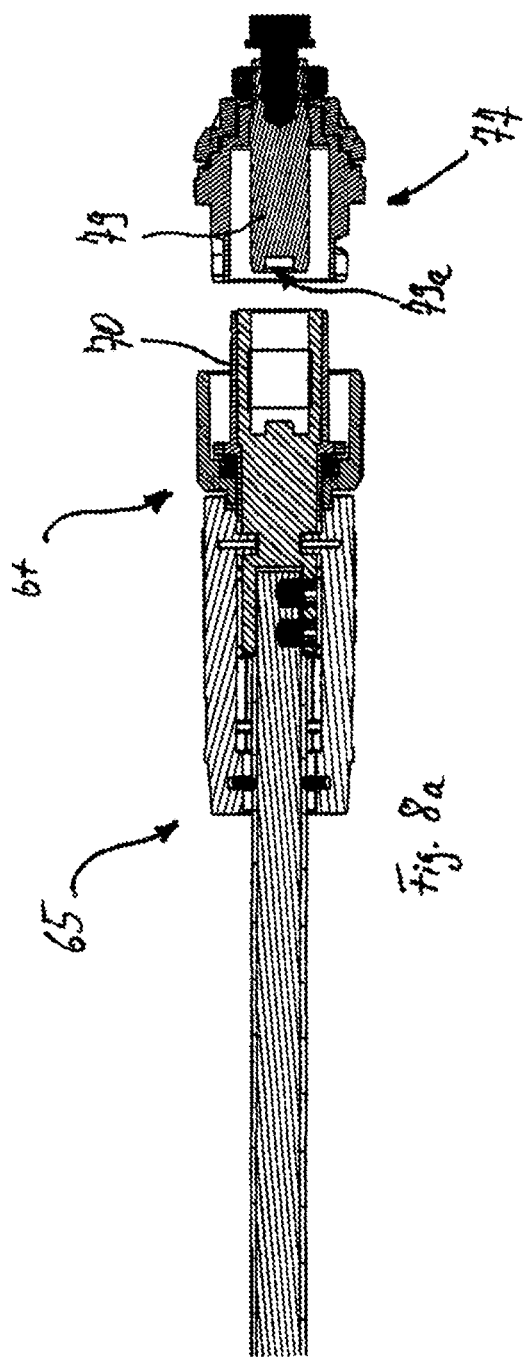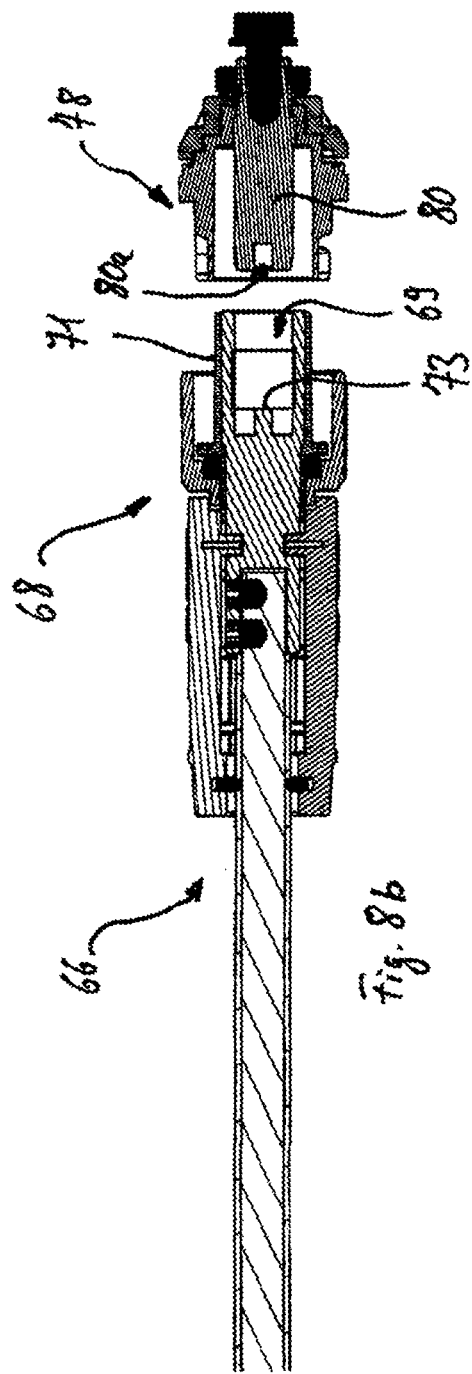

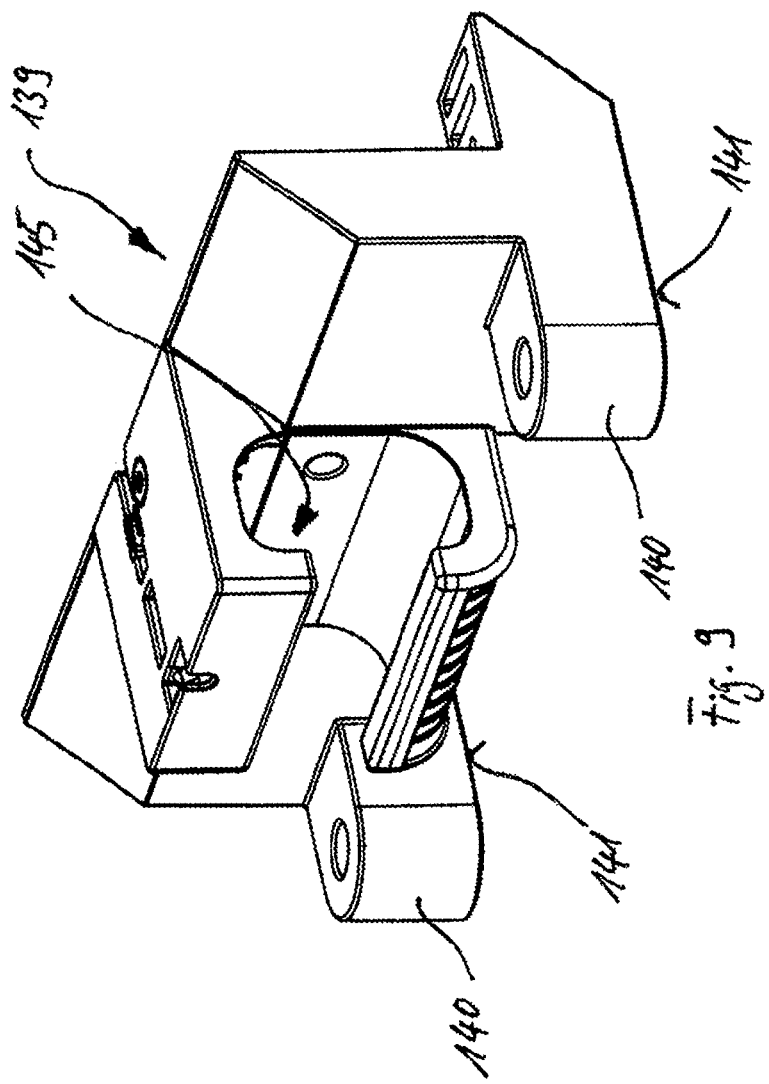

WELDING CURRENT SOURCE

RELATED APPLICATIONS

The present invention is a U.S. National Stage under 35 USC 371 patent application, claiming priority to Serial No. PCT/EP2018/000444, filed on 22 Sep. 2018; which claims priority of DE 102017009141.2, filed on 22 Sep. 2017, the entirety of both of which are incorporated herein by reference.

The invention relates to an arc welding current source for supplying an arc welding torch with electrical current and electric voltage for carrying out an arc welding method, the arc welding current source being provided with a housing in which a current transformer device is provided for processing electrical current fed into the welding current source for suitability in an arc welding method, wherein on the housing of the arc welding current source, two pole contact devices are also provided, each of which protrudes out of the housing along different longitudinal axes and is provided with connecting means for receiving a welding current cable.

There are a variety of different welding methods. The present invention is of particular importance for the various methods of arc welding. These are based on the generation of heat by an electric arc between a welding electrode and a workpiece on which a welding is carried out. Due to the generation of heat, the material(s) to be welded can be melted locally. In almost all arc welding methods, a protective gas is supplied to the area of the arc to, on the one hand, enable a resistance-reducing ionized atmosphere between the welding electrode and the workpiece, and on the other hand to prevent oxidation of the welding electrode and the workpiece. Instead of an inert gas provided here as a protective gas, an active gas or a mixed form which serves for the reaction can also be supplied. Likewise, electrodes can be provided that do not require an external gas supply, since the substances required for this are integrated into the electrodes and are released when the electrodes melt.

An arc welding torch is usually designed in such a way that a user or a robot can direct a metal welding wire, which can also be referred to as a metal filler, to a specified joint on the target metal piece. The welding wire is passed through the welding torch and finally transported to the target metal piece through an opening in the contact tip at the end of the welding torch.

When an electric voltage is applied to a welding torch inner tube and when the welding wire comes into contact with the target metal piece, high electric current flows from a welding torch inner tube through a so-called tip adapter, then through the contact tip, through the welding wire, and possibly an arc to the target metal piece, then to ground. The high current and the arc cause the welding wire to melt in a protective gas atmosphere, which leads to dripping of the wire and the formation of an arc.

This arc melts the metal of the target metal pieces and the continuously supplied welding wire. The resulting drops of the welding wire dripping, or the drops being transferred in a short circuit to the liquefied point of the target metal pieces leads to these being connected to each other.

Arc welding systems and/or arc welding circuits are each provided with a welding current source to provide the required electrical current and voltage, and the welding torch of the arc welding system must be connected thereto in an electrically conductive manner so that current can be supplied to the respective arc welding point and a voltage can be applied to it. This connection is usually produced by means of welding current cables, wherein a welding current cable is provided for each of the two poles of the given welding current source. In addition to a connection to the welding torch and a connection to the workpiece, each welding current cable must also be connected to the welding current source. If welding media such as protective gas and/or a welding wire are to be fed to the process point for the given welding method, this can also be done by one of the two welding current cables, in particular by means of a coaxial welding current cable which has a central passage for welding media. The present invention relates to welding current cables both without and with integrated media feed.

The welding current source has two pole contact devices for contacting the welding current source with the welding current cables. Pole contact devices as defined and described in the DIN EN 60974-12 standard are widespread. It is essentially a contact pin protruding from the housing of the given welding current source, configured on the circumferential surface thereof with a groove into which a pin of a plug of the welding current cable engages. After the pin is inserted into the groove, a connection is made between the contact pin and the plug by a rotational movement of the plug and the associated movement of the pin in the groove. A disadvantage of such previously known solutions is that the pole contacts protrude from and project beyond the housing of these welding current sources. As a result, the welding current cables connected to the pole contacts also protrude from the welding current source. These protruding cables are often in the way and increase the space required by the welding current source.

The invention is therefore based on the object of creating a possibility of avoiding collisions with welding current cables connected to a welding current source of the type mentioned at the outset.

This object is achieved according to the invention, in a welding current source of the type mentioned at the outset, in that at least one of the two pole contact devices is situated entirely within a projection surface of the housing in a plane in which a stand base of the welding current source is arranged, wherein the projection surface is implemented by a projection along an axis running perpendicular to the stand base. The invention provides that at least one, preferably both, pole contact devices of a welding current source according to the invention is/are situated entirely within the projection surface of the welding current source. According to the invention, the at least one pole contact device should therefore not protrude beyond the outer contour defined by the housing. This not only reduces the protrusion of welding current cables with connection elements beyond the housing and optionally also beyond its one-part or multi-part stand element, thus also reducing the risk of damage, but also, at the same time, this reduces the standing surface—the so-called footprint—of a welding current source in an industrial environment, such as a production hall. Particularly in the industrial environment when automatic arc welding machines are used, it is common to set up a large number of welding production cells in a production hall. Each such welding production cell can have at least one welding current source. A large number of welding current sources designed according to the invention can thus reduce the space requirement of a production system, and thus create the possibility of installing additional welding production cells in a production hall. Better utilization of a production hall means a reduction in production costs.

In a preferred embodiment of the invention, both pole contact devices of the welding current source can be situated entirely within the projection surface of the housing in the stand base of the welding current source. As a result, the advantages according to the invention of reducing the space requirement and reducing the risk of collision with welding current cables can be achieved to a special extent with particular consequences.

A likewise preferred embodiment of the invention can be characterized by an orientation of a longitudinal axis of at least one of the pole contact devices in which the longitudinal axis of the pole contact device forms an angle in a range from 0° to 45° with a perpendicular intersecting the stand base. It can furthermore be advantageous that the at least one pole contact device is provided with connecting means which are provided for producing and for fixing a releasable connection of the pole contact device to a welding current cable using a rotational movement of a connecting means about a longitudinal axis of the pole contact device, wherein the longitudinal axis emerges from the housing of the welding current source in such a manner that the longitudinal axis is oriented proceeding from the housing in the direction of the plane of the stand base. In a preferred embodiment of the invention designed according to these features, each pole contact device has an orientation of its longitudinal axis in which at least one component of the spatial profile of the longitudinal axis is oriented to be vertical to the stand base of the housing. With a longitudinal axis of the respective pole contact device running obliquely in the direction of the footprint, or particularly preferably perpendicularly to the footprint, not only can the space requirement for a welding current source and the welding current cable connected to it be kept as small as possible, but also ergonomically favorable handling properties can be achieved for the attachment and removal of a welding current cable. In addition, the placement of the welding current cables in the area of the welding current sources can be kept as close as possible to the welding current source, thereby reducing the risk of collisions with pole contact devices and the welding current cables connected to them. In particular, in a particularly preferred development of the invention, with a longitudinal axis of the at least one, preferably both, pole contact devices oriented perpendicular to the contact surface, the aforementioned advantages are particularly pronounced.

One welding current cable is connected to the at least one pole contact device, preferably one to each of the two pole contact devices, by means of a contacting and connecting device of the respective welding current cable. Each contacting and connecting device is designed in a suitable manner in order to produce a releasable mechanical connection and an electrical contact between the welding current cable and the pole contact device. The pole contact device, in particular its orientation and position on the housing, and the housing itself, are designed according to a preferred embodiment of the invention in such a way that the welding current cable connected to it is also situated within the footprint of the housing and is only routed out of the footprint of the housing at a predetermined point at a distance from the pole contact device and from the contacting and connecting device. In particular, each contacting and connecting device of the welding current cables should therefore also be situated within the (vertical) projection of the housing onto the stand base of the welding current source, and should therefore not protrude beyond the housing.

In order to allow good accessibility for a welding current cable connection to the at least one pole contact device according to the invention, it can be provided in a further preferred embodiment according to the invention that the housing has at least one lower section and at least one upper section, the upper section being at a greater distance than the lower section of the housing from the plane of the stand base, wherein the upper section projects beyond the lower section. At least one of the pole contact devices can be situated in this case on an underside of the upper section of the housing at a distance from the stand base. As a result, each respective pole contact device and a welding current cable connected to it are easily accessible, and nevertheless protected by the housing.

In a further preferred embodiment of the invention, the upper section of the housing can protrude and/or project past the lower housing part arranged below this housing part on two sides of the upper housing part. This results in the advantageous possibility that the two pole contact devices can be arranged one on each of the two projecting sides of the upper section of the housing, in particular on the undersides thereof. This makes it possible to lessen the chance of confusing the two pole contact devices when connecting a welding current cable, in a particularly simple manner, since the two pole contact devices are at a relatively large distance from each other and are spatially separated from each other by the lower section of the housing.

The advantages achievable with the invention can be further increased by a preferred development of the invention by at least one cable guide arranged on the housing for at least one welding current cable. With such a cable guide, in particular, it is possible to guide at least one of the welding current cables as much as possible within the footprint to a specific point at which the welding current cable exits the footprint. It can be particularly favorable in this case if a cable guide is arranged and oriented on the housing in such a manner that a welding current cable can be guided to the rear of the housing by means of the cable guide. Since welding current sources are usually operated on their front side, guiding the at least one welding current cable to the rear of the housing can particularly reliably prevent an operator from colliding with a welding current cable. The same applies for a cable guide with which at least one of the welding current cables can be guided to the underside of the welding current source, particularly in the case of a welding current source suspended at a distance from a ground surface.

Further preferred embodiments of the invention result from the claims, the description and the figures of the drawing.

The invention is explained in more detail with reference to exemplary embodiments shown purely schematically in the figures, in which:

FIG. 4 shows an exploded view of a contacting and connecting device of a welding current cable;

FIG. 5 shows a sectional view of the contacting and connecting device of FIG. 4;

FIG. 6 shows a sectional view of a contacting and connecting device in which a feed device for protective gas is integrated;

FIG. 7 shows a welding current cable designed as an extension cable, which is provided at both ends with a socket connection and a plug connection, in a sectional view, in a side view and in a perspective view;

FIG. 8a shows a sectional view of an end section of a welding current cable, together with part of a pole contact device which matches the welding current cable;

FIG. 8b shows in a sectional view an end section of a further welding current cable together with part of a pole contact device which matches the welding current cable;

FIG. 9 shows part of a stand element for the housing of the welding current source;

Figure 1:
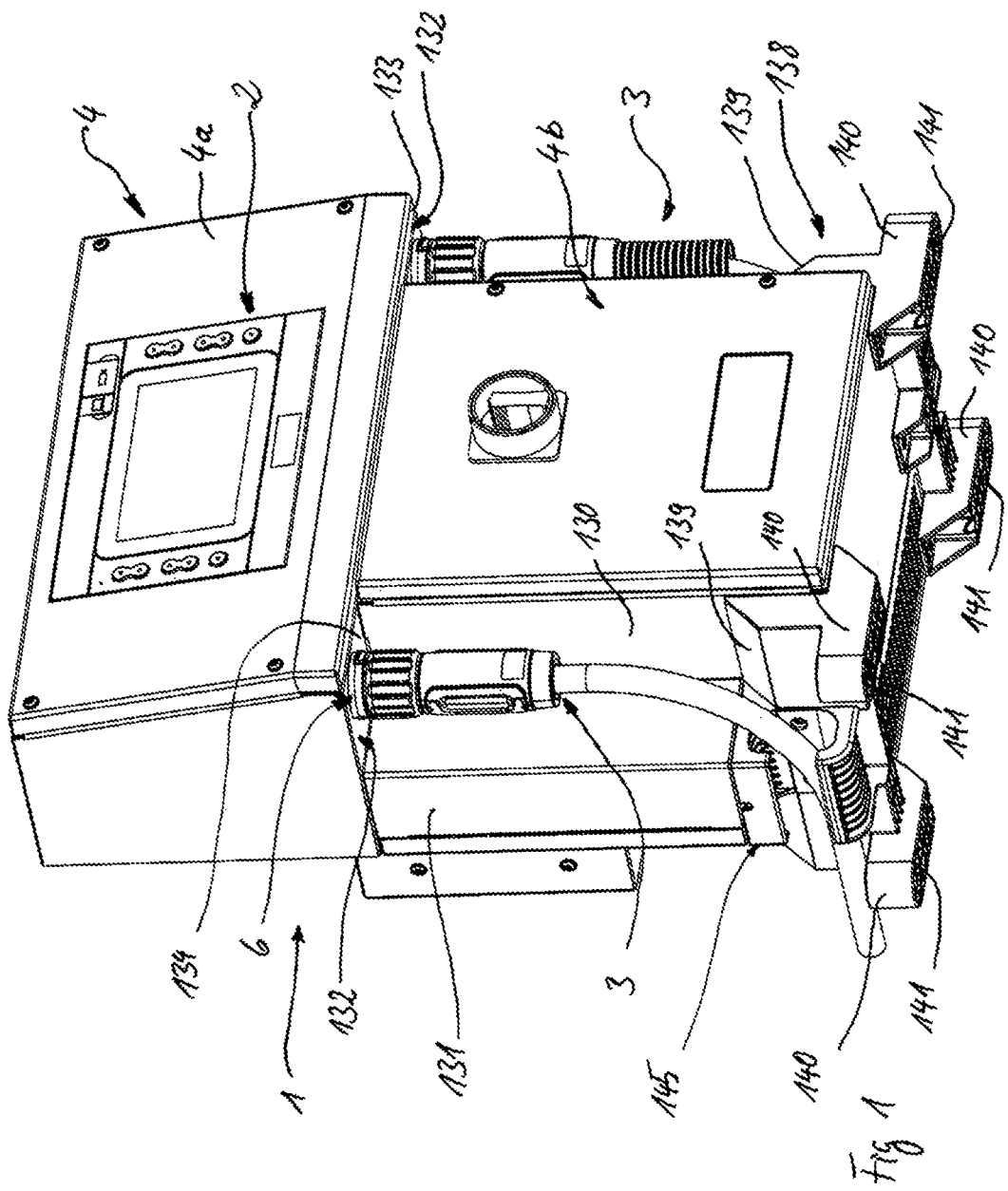
FIG. 1 shows a perspective view of a welding current source for arc welding methods, having welding current cables connected to its two pole contact devices.

FIG. 1 shows a welding current source 1 with which electrical current and an electrical voltage are provided for performing arc welding methods by means of an arc welding torch (not shown in more detail). In addition, the welding current source 1 contains a control device with an operating panel 2, with which parameters of each of the arc welding methods to be performed can be set and the welding method can be controlled. In the present case, the welding current source 1 can be used, for example, to carry out MIG/MAG or also TIG, plasma, electrode and all other arc welding methods or high-current applications. In further possible embodiments of the invention, other arc welding and cutting processes can also be carried out. The preferred embodiment of a welding current cable 3 discussed below and its connection to the welding current source 1 can also be used in this case.

Figure 3:
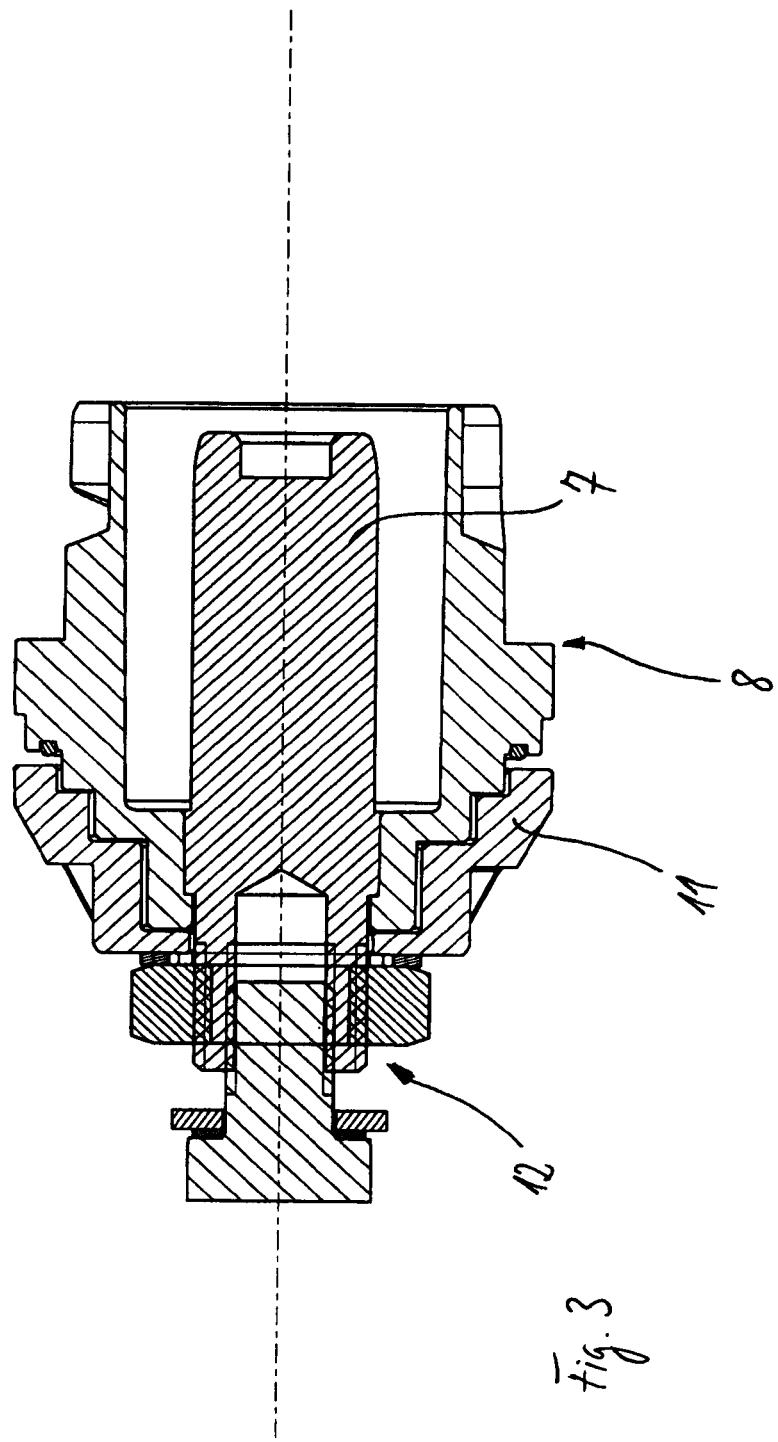
FIG. 3 shows a sectional view through a pole contact device according to FIG. 2.

Two pole contact devices 5, 6 protrude from a housing 4 of the welding current source 1; each of these is provided for the connection of one welding current cable 3 and is covered in FIG. 1 by a union nut 10 of the welding current cable 3. The pole contacts of the pole contact devices 5, 6 are each designed in the form of an essentially cylindrical contact pin 7. Each of these contact pins 7 is arranged in a central recess in a housing part 8 of the respective pole contact device 5, 6 (FIG. 3). A contact surface is formed on an end face 7a of each of the pole contacts—in this case, the contact pin 7. In particular, a lateral surface 7b of the contact pin 7 and, optionally, the end face 7a, can be provided for electrically conductive contact with one or more contact elements on the welding current cable—for example, contact blades, which are not shown in detail. Since the contact pin 7 is made entirely of an electrically conductive material, in particular of copper or a copper alloy, it is able to be an electrically conductive contact partner on its entire outer envelope and/or circumferential surface. The housing part 8 is formed with sections of different diameters, wherein section 8a has the largest diameter situated approximately in the middle with respect to a longitudinal axis of the housing part 8. In the direction of the housing of the welding current source, another section 8b follows, which has a smaller diameter than the first section 8a. A third section 8c is provided for the overall arrangement of a union nut 10 (FIG. 4) on the power cable on this third section 8c. A rear housing part 11, which in the exemplary embodiment is in the form of a cap, is arranged on the second section 8b. The contact pin 7 is detachably fastened on the housing part 8 to the rear housing part 11 and further fastening means 12.

The end face 7a is formed on an end section of the contact pin 7 which has a smaller diameter than the section of the contact pin 7 preceding it. Said preceding section thus serves as a stop for the positioning of the contact pin 7 in the housing part 8.

The housing part 8 has on its outer circumferential surface of the third section 8c two identical groove-shaped recesses 14, which are arranged at 180° to each other on the circumference, which are at least approximately constant in depth and width, and which run along part of the circumference of the section 8c. The groove-shaped recesses 14 are open on the end face 15 of the housing part and initially run approximately parallel to the longitudinal axis of the housing part 8. In the further course of the grooves 14, the grooves 14 each travel with a directional component in the circumferential direction, also towards section 8a with the largest diameter, to then once again approach the end face 15 of the housing part 8, likewise with a directional component in the circumferential direction. The section of the grooves 14 which also runs in the circumferential direction has an approximate V-shape in the preferred embodiment, wherein the two legs of the approximate V-shape have at least approximately the same length components in the axial direction, and components of different lengths in the radial direction.

As shown in FIG. 4, the welding current cable 3 is provided with a contacting and connecting device 17 on its end which is uninsulated a bit from the end thereof near the welding current source. A wire end sleeve 18 of the contacting and connecting device 17 is pushed onto the strands of the uninsulated cable 3. The wire end sleeve 18 is surrounded by a contact socket 19 provided as a contacting means for the welding current cable, wherein the wire end sleeve 18 is situated in a blind hole 19a of the contact socket 19 provided on the end face. The contact socket 19 also has a blind hole 19b on its other end face—the current source end face. An end of this blind hole 19b closest to the end face has a central pin 20 which centers the contact pin 7 provided for arrangement in the blind hole.

On its outer, at least substantially cylindrical lateral surface, the contact socket 19 has two blind hole recesses 21 (FIG. 5) which, seen in the longitudinal direction, are situated between the two blind holes 19a, 19b. In addition, the contact socket 19 has on its outer lateral surface a shoulder 22 which—again seen in the longitudinal direction—is situated between the blind hole recesses 21 and the end of the contact socket closest to the current source. The contact socket 19 is clamped together with the wire end sleeve 18 to the uninsulated welding current cable 3 by means of two grub screws 23.

An electrically non-conductive insulating sleeve 25 is pushed onto the metallic contact socket 19, preferably made of copper or copper alloys. In its end position on the contact socket 19, the insulating sleeve 25 extends with its one end face to just before the blind hole recesses 21 of the contact socket 19 and with its other end face to the end of the contact socket 19 closest to the current source side. The inner wall delimiting the recess of the insulating sleeve 25 is also provided with a shoulder 26 which corresponds to the shoulder 22 of the outer surface of the contact socket 19, such that insertion of the contact socket 19 into the insulating sleeve 25 is limited by the shoulder 26 of the insulating sleeve 25. The insulating sleeve 25 lies against the outer surface of the contact socket 19 both in the area of the shoulder 22 and—seen in the longitudinal direction—on both sides of the shoulder 22. On its outer lateral surface, the insulating sleeve 25 is provided with an annular flange 27 arranged at a distance from the end of the welding cable.

The welding current cable 3 is provided, for the handling thereof, with a grip sleeve 29 as part of the handling device.

The grip sleeve 29 is clamped onto the contact socket 19 and onto the welding current cable 3. The grip sleeve 29 surrounds a part of the contact socket 19 and an end section of the welding current cable 3. The grip sleeve 29 has two grip shells 29a, 29b which are connected to each other by means of a click connection. For this purpose, the two grip shells 29a, 29b are provided with a plurality of latching hooks 30 and recesses 31. The latching hooks 30, which are each integrally connected to one of the grip shells 29a, 29b, are provided for engagement and latching in one of the recesses 31. In the area of one of the ends of the grip sleeve, the same has an encircling groove on its inner surface, into which a sealing ring 32 is inserted, the inner surface of which rests against an outer protective and insulating sleeve (sheath) 3a of the welding current cable 3.

At its other end at the end face, the grip sleeve 29 is provided on its inner surface with a cutout 35 of the inner wall. While the inner wall is seated on an end region of the outer surface of the insulating sleeve 25, the boundary surface of the grip sleeve 29 created by the cutout overlaps a shoulder 10a of the outer peripheral surface of the union nut 10, which is situated in the region of the end of the union nut 10 on the side of the welding current cable and has a smaller diameter than the remaining lateral surface of the substantially hollow cylindrical union nut 10. As can be seen in particular in FIG. 4, the union nut 10 has on its otherwise smooth inner surface two identical cams 36 offset on the circumference by 180°, the size of which is matched to the height and width of the grooves 14 of the housing part 8 in such a manner that the cams 36 are arranged in the grooves 14 and can be moved as smoothly as possible. The cams 36 are situated on the inner surface 10b of the union nut at a short distance from the end of the union nut 10 on the end face closest to the welding current source. The union nut 10 has a shoulder on its inner surface in the region of its welding current cable end toward a region with a first reduced diameter which adjoins a second regions of a further reduced diameter.

As can be seen in particular in FIG. 5, a spring element 39 lies against the inner annular end face 38 formed by the diameter reductions, and is supported on one of its two ends on this inner end face 38. Since the union nut 10 is pushed onto the insulating sleeve 25, the spring element 39 lies with its other end against the flange 27 of the insulating sleeve 25. Because the insulating sleeve 25 is fixed in the axial direction on the contact socket 19, but the union nut 10 can be moved back and forth in the axial direction against the spring force of the spring element 39 between the grip sleeve 29 and the flange 27 of the insulating sleeve 25, the spring element 39 can be compressed by means of an axial movement of the union nut 10. Likewise, the union nut 10 can be moved in the axial direction towards the grip sleeve by the spring force of the compressed spring element 39 in order to ensure a firm fit in the bayonet in the locked position.

In order to connect the welding current cable 3 to the welding current source 1 or another welding current source, the welding current cable 3 can be handled manually on its grip sleeve 29. For this purpose, with the contact socket 19 protruding from the union nut 10 should be brought to the contact pin 7 of one of the pole contact devices 5, 6 of the welding current source 1. The contact socket 19 is then guided with the blind hole 19b over the contact pin 7. The union nut 10, which is rotatable about its own longitudinal axis can now also be aligned, by manual manipulation, with the cams 36 in such a manner that the cams 36 are situated in the axial direction in front of the end face of the housing part 8 and in the direction of rotation at the entrances of the grooves 14. The cams 36 can then be inserted into the grooves 14 by a movement parallel to the longitudinal axis. The spring element 39 is thereby placed under tension. Each cam 36 can be guided in the respective groove 14 along its further course of travel. After the cam 36 has traversed the segment of the respective groove 14 running parallel to the longitudinal axis, it is guided into the approximately V-shaped segment of the groove 14, in which the cam 36 executes a movement with one component in the circumferential direction and one component parallel to the longitudinal axis. The union nut 10 in this case is moved in the circumferential direction and at the same time initially carries out a further lifting movement counter to the spring force of the spring element 39. After the cam 36 has reached the apex of the V-shape of its movement, the spring element is slightly relieved during the rotational movement and at the same time during a slight lifting movement parallel to the longitudinal axis, but now in the opposite direction away from the grip sleeve 29. The bayonet connection between the union nut 10 of the welding current cable 3 and the housing part 8 of the welding current source 1 is then produced. The segment of the V-shape first traversed by the respective cam 36, that is to say the segment that runs between the axially parallel segment of the groove and the apex of the V-shape, has—with at least approximately the same length in the longitudinal axis direction—a smaller gradient than the second segment of the V shape. As a result, less force is required to transfer the cam 36 into its latching position than to transfer the cam 36 out of its latching position. This design allows additional security against unintentional loosening of the bayonet connection.

This connection between the welding current cable 3 and one of the pole contact devices 5, 6 of the welding current source 1 can now only be released by the application of force against the prestressed spring element 39 and simultaneous rotational movement in the now-opposite direction of rotation in the direction of the circumference of the housing part 8.

A further preferred exemplary embodiment of a welding current cable 3 according to the invention is shown in FIG. 6. In this embodiment, a media feed 42 for a protective gas, such as argon, $CO_2$, or a mixed gas, is integrated into the welding current cable 3 directly behind the bayonet connection and behind the union nut 10, and also behind the blind hole recesses 21 of the grip sleeve 29, and feeds into a central recess 46 of the welding current cable. Except for this aspect, the welding current cable from FIG. 6 corresponds to the welding current cable shown and discussed in FIGS. 2 to 5, and in particular also corresponds to the bayonet connection produced together with a welding current source between the welding current cable and the welding current source. Therefore, only the differences from the embodiment according to FIGS. 2 to 5 will be discussed below.

A shell 29a, 29b of the two-part grip sleeve 29 is provided with a passage 43 running through its wall, to which a feed line 44 coming from the outside is connected. This passage 43 leads through the grip sleeve 29 into a blind hole 45 of the contact socket 19. The blind hole 45 in turn leads into a central recess 46 with which the welding current cable 3 of this embodiment is provided from the media feed to its other end. The welding current cable 3 of this embodiment also has electrically conductive copper strands 47, which are arranged in the cable coaxially with the recess 46 and inserted at one end into a corresponding recess in the contact socket 19 and arranged therein. The copper strands 47 are in turn surrounded by an insulating sleeve and/or sheath 48 of the welding current cable, which is also formed centrally. With this welding current cable 3, current and voltage of the welding current source can thus be transmitted to a welding torch or to a device in the welding circuit by means of the contact socket 19, and a protective gas can be supplied to the welding torch. A detachable connection between the welding current source and the welding current cable can be made with an identical bayonet connection as in the exemplary embodiment in FIGS. 2 to 5, wherein the component thereof on the welding current cable, namely the union nut 10 and its cams 36, are decoupled from the welding current cable 3 itself for rotary movements and loads. As a result, the welding current cable 3 is also decoupled from rotary movements of the union nut 10. In this regard, reference is made to the corresponding figures and descriptions relating to FIGS. 1 to 5.

Figure 2:
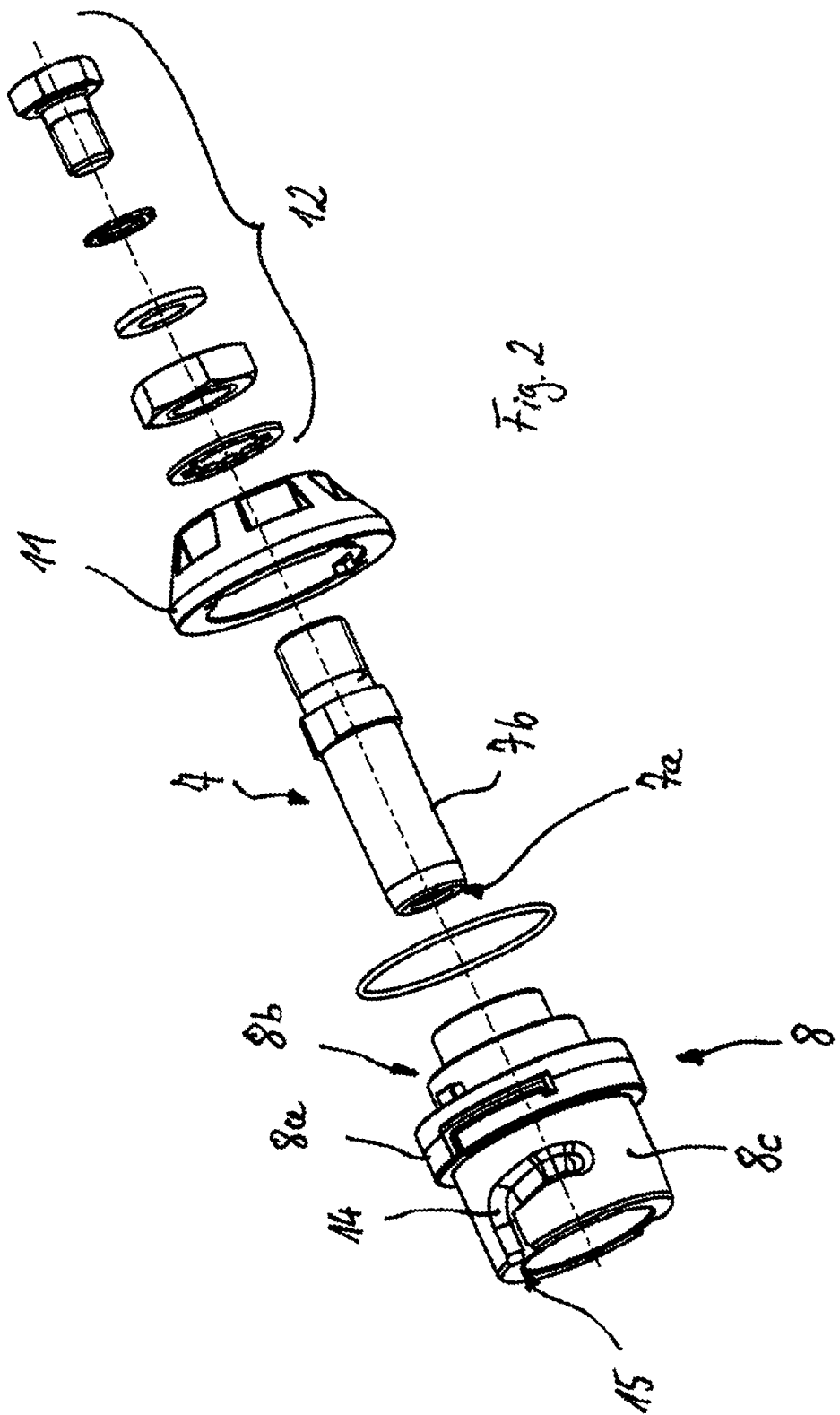
FIG. 2 shows an exploded view of a pole contact device of the welding current source.

A further preferred exemplary embodiment of the invention is shown in FIG. 7. This is a welding current cable designed as an extension cable 50. Such an extension cable 50 can be provided, for example, to extend a welding current cable such as that shown in FIG. 4. An application for such an extension cable 50 can be, for example, that the welding current cable from FIG. 4 is too short for a welding current source to be connected to a component of a welding circuit. An extension cable 50 can then be used to bridge a greater distance between a pole contact device 5, 6 of a welding circuit component, for example an arc welding torch. For this purpose, the extension cable 50 has at one of its ends a plug connection 51, the geometry and shape of which corresponds to the plug part of the pole contact device as shown in FIGS. 2 and 3. The plug connection 51 corresponds substantially to the housing part 8 and the contact pin 7 of the pole contact device from FIGS. 2 and 3. At the end of the cable and in the area of the plug connection 51, the extension cable 50 is also provided with a grip sleeve 52 which has two grip shells connected to each other and has a similar design to the grip sleeve 29 of FIGS. 4 and 5. The grip sleeve 52 clamped onto the sheath of the welding current cable grasps the housing part 53 of the plug connection 51 on its end face and fixes it on the sheath of the extension cable 50 in a torque-proof manner relative to the sheath.

The contact pin 107 of the plug connection 51 has on its cable-side end face a recess 54 in which the uninsulated end of the cable is arranged and clamped to the contact pin 107 by means of a wire end sleeve and screws. The other end of the contact pin 107 protrudes into the housing part 53 such that the housing part 53 concentrically surrounds the contact pin 107. The end of the contact pin 107 is only slightly set back relative to the end face 58 of the housing part 53.

At its other end, the extension cable 50 is provided with a socket connection 60 which corresponds to the socket connection of the welding current cable from FIGS. 4 and 5. In particular, both the union nut 110 used here, and also the grip sleeve 129 and the contact socket 119, are identical to the corresponding components from the exemplary embodiment according to FIGS. 4 and 5. Here, too, the union nut 110 is rotatable relative to the sheath of the extension cable 50. As can be seen in FIG. 7, as in the exemplary embodiment according to FIGS. 4 and 5, the contact socket 119 protrudes beyond the end face of the union nut 110 of the plug connection. In the region of the end face protruding beyond the union nut, the contact socket 119 has a blind hole 119a, on the end face of which a pin 120 is formed.

FIGS. 8a, 8b show end regions of two welding current cables 65, 66, each of which is provided with a socket connection 67, 68. The socket connection 67 of FIG. 8a corresponds completely to the socket connection from FIGS. 4 and 5. The socket connection 68 of FIG. 8b, on the other hand, differs in terms of the geometric shape of the end face of its blind hole 69 of the contact socket 71. In contrast to the contact socket 70 from FIG. 8a, in the case of the contact socket 71 the cylindrical pin 73 is provided with a greater length in the axial direction and has a smaller diameter than the pin 20 from FIG. 5 and the pin from FIG. 8a. In both embodiments from FIGS. 8a and 8b, the respective union nut can be rotated endlessly relative to the sheath of the welding current cable.

Each of the two contact sockets 70, 71 is assigned a plug connection 77, 78, the respective contact pin 79, 80 of which is designed to match the associated contact socket 70, 71. In particular, the recess 79a, 80a of the respective contact pin 79, 80 made on the free end face is adapted to the geometric shape of the respective pin 72, 73 with respect to length and diameter. As a result, each of the two socket connections 67, 68 can only be inserted into the plug connection 77, 78 assigned to it in a position in which the cam of the respective union nut can be inserted into the groove of the housing part and transferred into the respective latching position. These socket/plug connections are thus coded, so that it is not possible to confuse the plug connections with the respective socket connections of the other type. If the two pole contact devices are each provided with one of the two and thus different socket connections, a reversal of the ground welding current cable and the welding current cable for the positive pole of the welding current source when connecting to the respective pole contact device 5, 6 can be ruled out.

As can be seen, inter alia, in FIG. 1, the upper section 4a of the housing 4 projects on both sides of the housing in relation to the narrow front part 130 of the T-shape of the lower housing section 4b. With regard to the rear, wider part 131 of the T-shape of the lower housing section 4b, the upper housing section 4a has a width which corresponds at least approximately to the width of the rear, wider part 131 of the lower housing section 4b. This configuration results in a region of the upper housing section 4a on each of the sides of the housing 4, in which an underside 132 of the projecting part of the upper housing section is covered by a housing cover—in this case, a housing plate 133, 134—and is freely accessible. These two areas of the underside 132 of the upper housing section 4a are rectangular in the exemplary embodiment and freely accessible from the front and from one side of the housing 4. These two areas of the underside 132 of the upper housing section 4a are separated from each other by the narrow part of the T-shape of the lower housing section. One of the two pole contact devices 5, 6 is arranged on one of the two regions of the underside 132 of the upper housing section 4a in each case, such that only one of the pole contact devices 5, 6 is situated on each of these two areas. The two pole contact devices 5, 6 thus protrude on the underside 132 of the upper housing section 4a from the housing 4 of the preferred welding current source according to the invention.

On its underside, the housing 4 is provided with a multi-part, namely two-part, stand element 138. In the exemplary embodiment, the two parts 139 of the stand element 138, one of which is shown in FIG. 9, are identical. Each of the two parts 139 of the stand element 138 is joined to one of the sides of the housing 4 and fastened there. The stand element 138 is provided with four foot elements 140, which are each arranged at a corner of the rectangular basic shape of the stand element 138. Each of the four foot elements 140 has a flat stand surface 141 (FIG. 1) as the underside, with which the respective foot element 140 stands on a suitable ground surface such as a floor of a production hall. All stand surfaces 141 are situated in the same two-dimensional plane, namely a stand base/area. The stand base is identical to the surface of the generally flat ground surface on which the welding current source is intended to be stood up. The so-called footprint of the welding current source is also situated inside the stand base. The footprint is a projection of the welding current source 1 onto the stand base perpendicular to the stand base. The size of the footprint thus results—in relation to a plan view of the welding current source 1—from the outer contour of the welding current source.

In the preferred exemplary embodiment of the invention shown, the two regions of the underside 132 of the upper housing section are oriented at least substantially parallel to the stand surfaces 141 and to the stand base. In addition, the two areas of the underside 132 of the upper housing section are at a relatively large distance from the stand surfaces 141, which results from the height of the lower housing section 4b and the stand element 138. In this way, the pole contact devices 5, 6 are easily accessible despite their arrangement at the two regions of the underside of the upper housing section.

Figure 10:
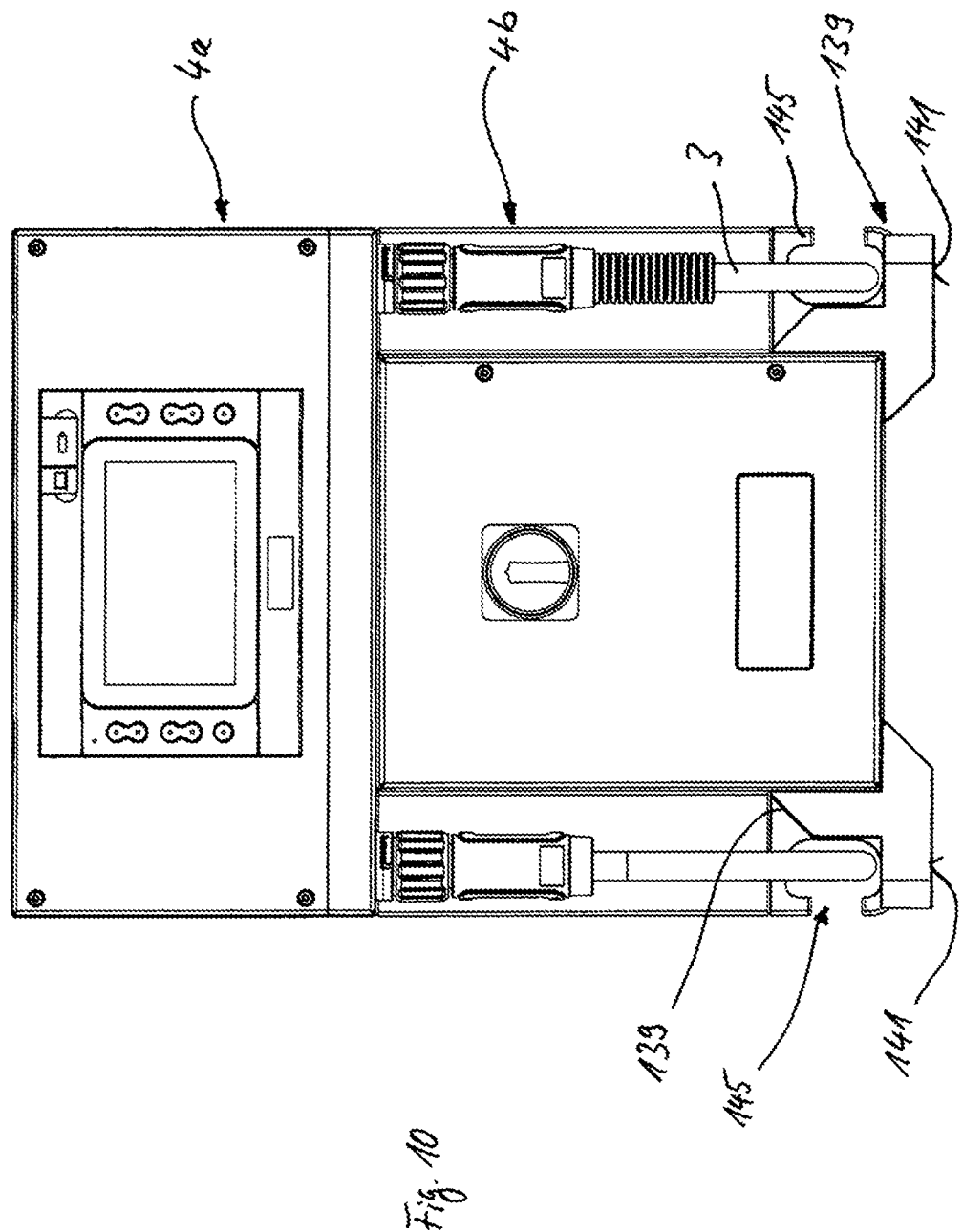
FIG. 10 shows the welding current source of FIG. 1 in a side view.

The pole contacts of the pole contact devices 5, 6 are each designed in the form of substantially cylindrical contact pin 7. A longitudinal axis of the respective contact pin is oriented substantially perpendicular to the surface of the underside 132 and to the stand base on which it is arranged. The longitudinal axes of the contact pins 7 of the two pole contact devices 5, 6 thus run parallel to each other. A welding current source according to the invention can preferably also have a device for guiding at least one of the welding current cables. The welding current source 1 is preferably provided with a cable guide device which provides at least one separate cable guide means 145 for each of the two welding current cables 3. With the cable guide means 145, the welding current cable 3 can be guided in a predetermined manner on the housing of the welding current source 1, such that the respective welding current cable 3 emerges from the contour of the housing 4 at a predetermined point. In the embodiment of FIGS. 1 to 13, the channel-like cable guide means 145 is arranged on each end face of the welding current source 4 on the stand element 138. The channel-like cable guide means 145 is situated on the stand element part 139 between its two foot elements 140 and is open on its two end faces for the passage of a welding current cable. Likewise, both channel-like cable guide means 145 are laterally provided with a slot which extends over the entire length of the cable guide means 145 and through which a welding current cable 3 can be inserted laterally into the channel-like cable guide means 145. As can be seen in particular from the front view of FIG. 10, the two channel-like cable guide means 145 are situated within the contour of the welding current source 1. Thus, the welding current cable coming from the respective pole contact device 5, 6 can—with respect to a projection onto the stand base—run within the footprint proceeding from the respective pole contact device 5, 6 to the rear of the welding current source and only emerge from the footprint in a predetermined manner at the rear of the welding current source. The cable guide means 145 can be designed in the manner of a handle recess, on both an inside and an outside thereof, so that the welding current source can be transported by grasping the cable guide means 145.

Figure 11:
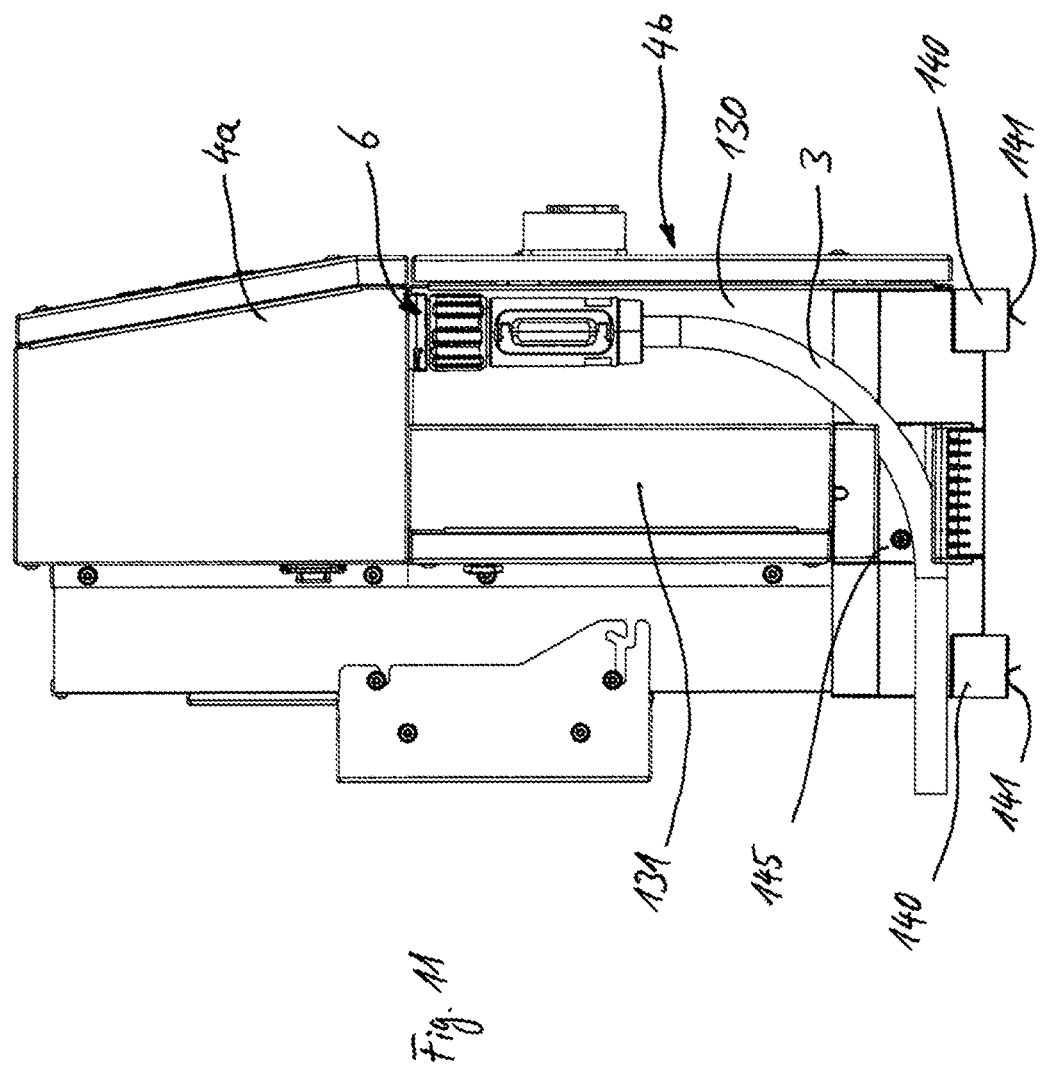
FIG. 11 shows the welding current source of FIG. 1 and FIG. 10 in a side view.
Figure 12:
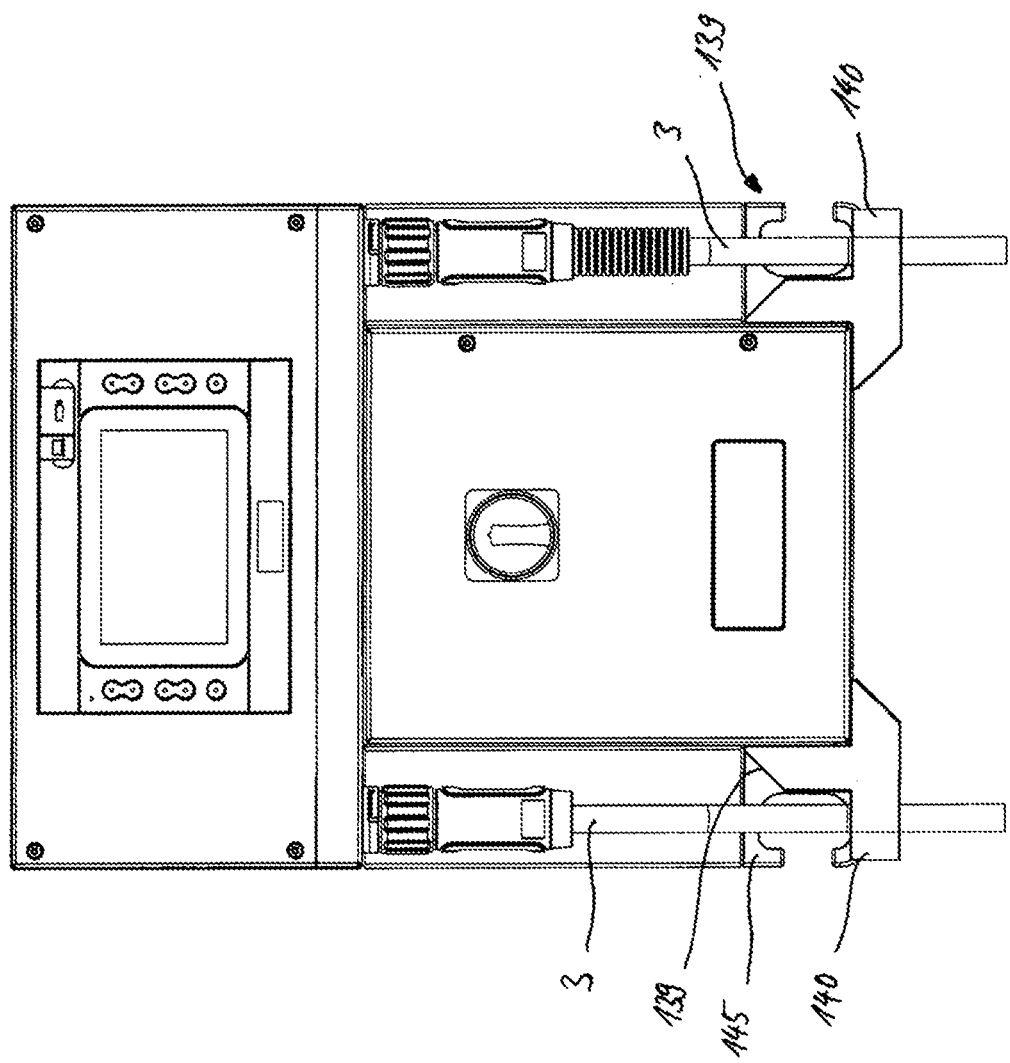
FIG. 12 shows the welding current source of FIG. 1 with a modified cable routing, in a front view.
Figure 13:
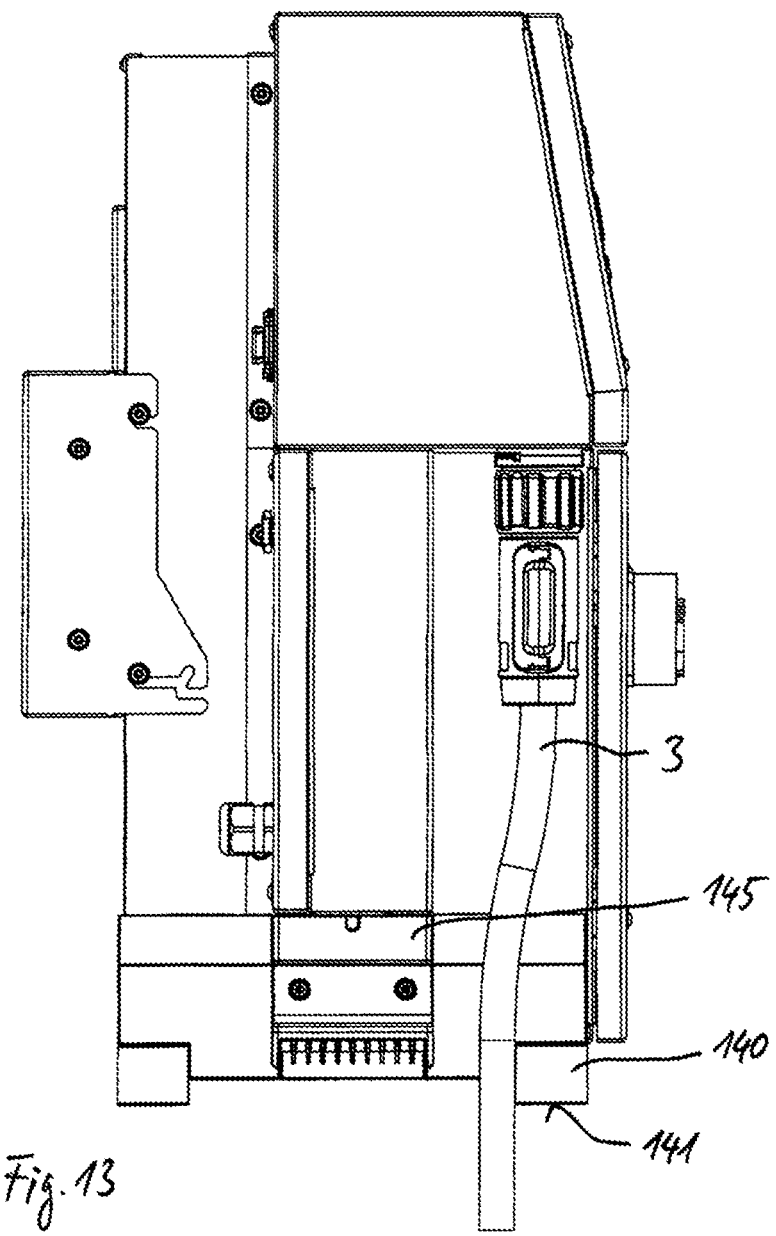
FIG. 13 shows the welding current source of FIG. 12 in a side view.

As shown in FIG. 11, the respective channel-like cable guide means 145 is arranged at a distance from the front foot element 140 of the same stand element part 139. This open area between the cable guide means 145 and the front foot element can be used as a further cable guide means, as shown in FIGS. 12 and 13. With the aid of these cable guide means, each of the two welding current cables can be guided within the contour of the welding current source to the plane of the stand bases of the foot elements and can be led down from there and/or out of the contour of the welding current source. Such a solution can be of particular importance for applications in which the welding current source is arranged in a hanging position.

LIST OF REFERENCE NUMBERS

| | |
|---|---|
| 1 | welding current source |
| 2 | control panel |
| 3 | welding current cable |
| 3a | protective and insulating sleeve |
| 4 | housing |
| 4a | upper section |
| 4b | lower section |
| 5 | pole contact devices |
| 6 | pole contact devices |
| 7 | contact pin |
| 7a | end face |
| 7b | lateral surface |
| 8 | housing part |
| 8a | first section |
| 8b | second section |
| 8c | third section |
| 10 | union nut |
| 10a | shoulder |
| 10b | inner surface |
| 11 | rear housing part |
| 12 | fastening means |
| 14 | groove-shaped recess |
| 15 | end face |
| 17 | contacting and connecting device |
| 18 | wire end sleeve |
| 19 | contact socket |
| 19a | blind hole |
| 19b | blind hole |
| 20 | pin |
| 21 | blind hole recess |
| 22 | shoulder |
| 23 | grub screw |
| 25 | insulating sleeve |
| 26 | shoulder |
| 27 | flange |
| 29 | grip sleeve |
| 29a | grip shell |
| 29b | grip shell |
| 30 | latching hook |
| 31 | recess |
| 32 | sealing ring |
| 33 | |
| 35 | cutout |
| 36 | cam |
| 37 | end face |
| 38 | end face |
| 39 | spring element |
| 42 | media feed |
| 43 | passage |
| 44 | feed line |
| 45 | blind hole |
| 46 | centric recess |
| 47 | copper strands |
| 48 | insulation sleeve |
| 50 | extension cable |
| 51 | plug connection |
| 52 | grip sleeve |
| 53 | housing part |
| 54 | recess |
| 58 | end face |
| 60 | socket connection |
| 65 | welding current cable |
| 66 | welding current cable |
| 67 | socket connection |

| | |
|---|---|
| 68 | socket connection |
| 69 | blind hole |
| 70 | contact socket |
| 71 | contact socket |
| 72 | pin |
| 73 | pin |
| 77 | plug connection |
| 78 | plug connection |
| 79 | contact pin |
| 79a | recess |
| 80 | contact pin |
| 80a | recess |
| 107 | contact pin |
| 110 | union nut |
| 119 | contact socket |
| 119 | blind hole |
| 120 | pin |
| 130 | narrow front part |
| 131 | rear wider part |
| 132 | underside |
| 133 | lower housing plate |
| 134 | lower housing plate |
| 138 | stand element |
| 139 | part of the stand element |
| 140 | foot element |
| 141 | stand surface |
| 145 | cable guide means |

The invention claimed is:

1. A welding current source for supplying an arc welding torch with electrical current and voltage for carrying out an arc welding method, the welding current source comprising:
a housing in which a current transformer device is provided for processing electrical current and voltage fed into the welding current source for suitability in an arc welding method, the housing has at least one lower section and at least one upper section, wherein the at least one upper section is at a greater distance than the at least one lower section of the housing from a plane of a stand base, and the at least one upper section projects beyond the at least one lower section;
two pole contact devices connected to the housing, at least one of the pole contact devices is arranged on an underside of the at least one upper section; and
a welding current cable connected to each of the two pole contact devices with a connecting means,
wherein the two pole contact devices are situated entirely within a projection surface of the housing in the plane in which the stand base of the welding current source is situated, the two pole contact devices protruding out of the housing from the projection surface along a longitudinal axis that intersects the projection surface, at least one pole contact device of the two pole contact devices is equipped with a connecting means which is provided for producing and for fixing a releasable connection of the at least one pole contact device to a welding current cable using a rotational movement of a connecting means about a longitudinal axis of the at least one pole contact device, wherein the longitudinal axis emerges from the housing of the welding current source in such a manner that the longitudinal axis is oriented in a direction of the plane of the stand base, and
wherein the projection surface is implemented by a projection along an axis running perpendicular to the stand base.

2. The welding current source according to claim 1, wherein the underside being at a distance from the stand base of the housing.

3. The welding current source according to claim 1, wherein the at least one upper section of the housing projects beyond the at least one lower section on two sides of the housing.

4. The welding current source according to claim 3, wherein one of the two pole contact devices is arranged on one of the projecting sides of the housing on the respective underside thereof.

5. The welding current source according to claim 3, wherein at least one cable guide means arranged on the housing for at least one welding current cable, through which the welding current cable can be guided to the rear of the housing.

6. The welding current source according to claim 1, wherein an orientation of the longitudinal axis of at least one of the pole contact devices in which the longitudinal axis of the pole contact device forms an angle with a perpendicular intersecting the stand base in a range from 0° to 45°.

7. The welding current source according to claim 1, wherein at least one current-carrying cable connected by means of a contacting and connecting device of the welding current cable to the pole contact device of the welding current source, the contacting and connecting device of the welding current cable being situated entirely within the projection surface of the housing in the plane in which the stand base of the welding current source is situated.

* * * * *